United States Patent
Ori

(12) United States Patent (10) Patent No.: US 6,317,272 B2
Ori (45) Date of Patent: Nov. 13, 2001

(54) ZOOM LENS

(75) Inventor: Tetsuya Ori, Koshigaya (JP)

(73) Assignee: Fuji Photo Optical Co., Ltd., Omiya (JP)

( * ) Notice: Subject to any disclaimer, the term of this patent is extended or adjusted under 35 U.S.C. 154(b) by 0 days.

(21) Appl. No.: 09/766,581

(22) Filed: Jan. 23, 2001

(30) Foreign Application Priority Data

Feb. 4, 2000 (JP) .................................................. 12-027668

(51) Int. Cl.[7] .................................................. G02B 15/14
(52) U.S. Cl. ........................... 359/687; 359/715; 359/740
(58) Field of Search .................................... 359/685, 687, 359/686, 715, 774, 740

(56) References Cited

U.S. PATENT DOCUMENTS

| | | | |
|---|---|---|---|
| 5,235,466 | 8/1993 | Ono et al. | 359/684 |
| 5,267,082 | 11/1993 | Ono et al. | 359/684 |
| 5,296,696 * | 3/1994 | Mihara | 359/687 |
| 5,313,331 * | 5/1994 | Mihara | 359/687 |
| 5,424,869 * | 6/1995 | Nanjo | 359/687 |
| 5,546,231 * | 8/1996 | Sato | 359/687 |
| 5,583,698 | 12/1996 | Yamada et al. | 359/687 |
| 5,583,699 * | 12/1996 | Nakayama | 359/687 |
| 5,719,708 * | 2/1998 | Nagaoka | 359/687 |
| 5,798,872 * | 8/1998 | Uzawa | 359/686 |
| 5,940,221 * | 8/1999 | Okayama et al. | 359/687 |
| 5,963,378 * | 10/1999 | Tochigi et al. | 359/687 |
| 5,969,879 * | 10/1999 | Park | 359/687 |
| 6,101,043 * | 8/2000 | Kohno et al. | 359/687 |
| 6,104,547 * | 8/2000 | Nanba | 359/687 |
| 6,124,983 * | 9/2000 | Yahagi et al. | 359/687 |
| 6,166,864 * | 12/2000 | Horiuchi | 359/687 |
| 6,226,130 * | 5/2001 | Mukaiya et al. | 359/687 |

FOREIGN PATENT DOCUMENTS

| | | |
|---|---|---|
| 8-5916 | 1/1996 | (JP) . |
| 11-194269 | 7/1999 | (JP) . |

* cited by examiner

*Primary Examiner*—Evelyn A Lester
(74) *Attorney, Agent, or Firm*—Arnold International; Bruce Y. Arnold

(57) ABSTRACT

A zoom lens formed of no more than four lens groups having refractive power of, in order from the object side, positive, negative, positive, and positive. The first and third lens groups are fixed in position, whereas the position of the second lens group along the optical axis is varied to change the focal length during zooming, and the position of the fourth lens group is adjusted along the optical axis so as to compensate for what otherwise would be movement of the image surface with zooming and distance to the object. The second lens group includes a negative lens element having a concave surface or a planar surface on its object side, a combined lens which includes a biconcave lens element joined to a positive meniscus lens element with its convex surface on the object side. The third lens group consists of a single lens element with at least one surface thereof being aspherical, and the fourth lens group includes a lens element having an aspherical surface. Various conditions are satisfied in order to ensure the overall length of the lens is short and that various aberrations, especially axial chromatic aberration at the telephoto end, are favorably corrected.

6 Claims, 7 Drawing Sheets

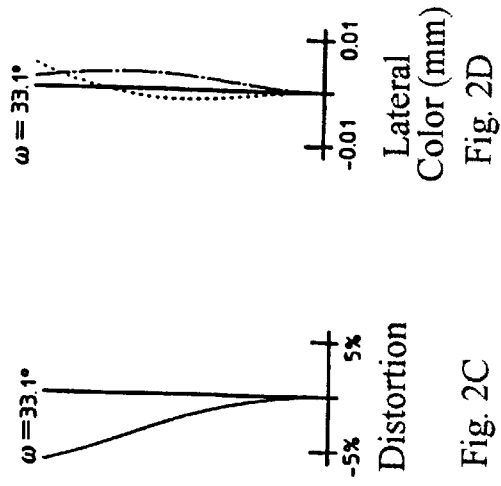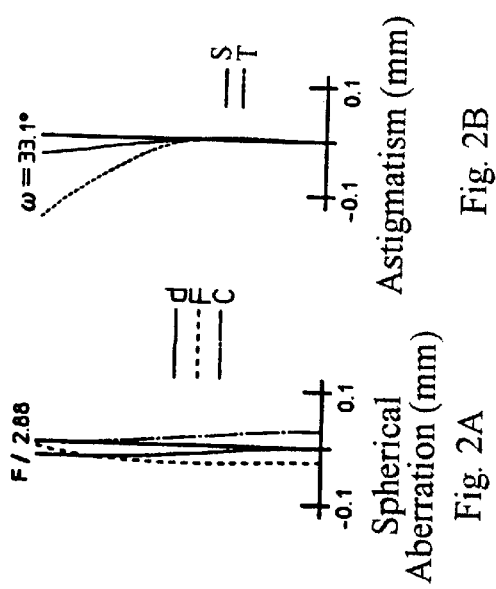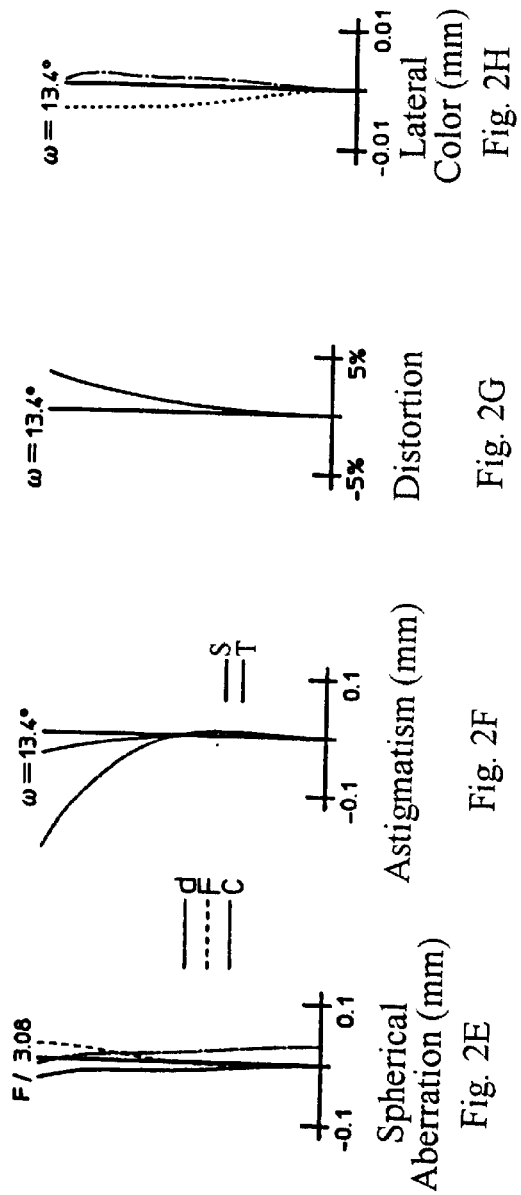

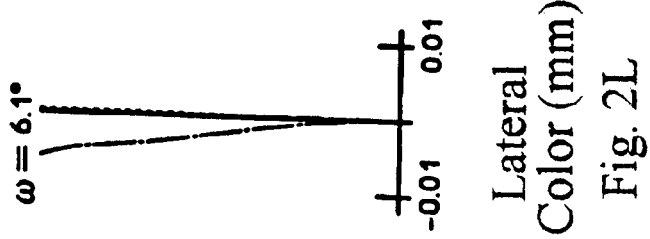
Fig. 2L Lateral Color (mm)
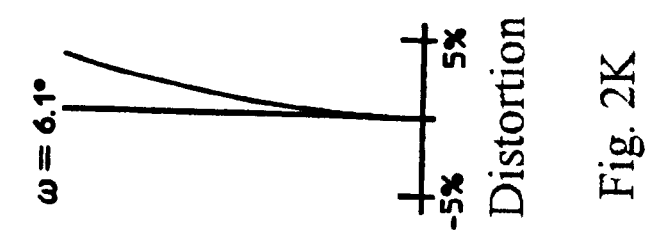
Fig. 2K Distortion
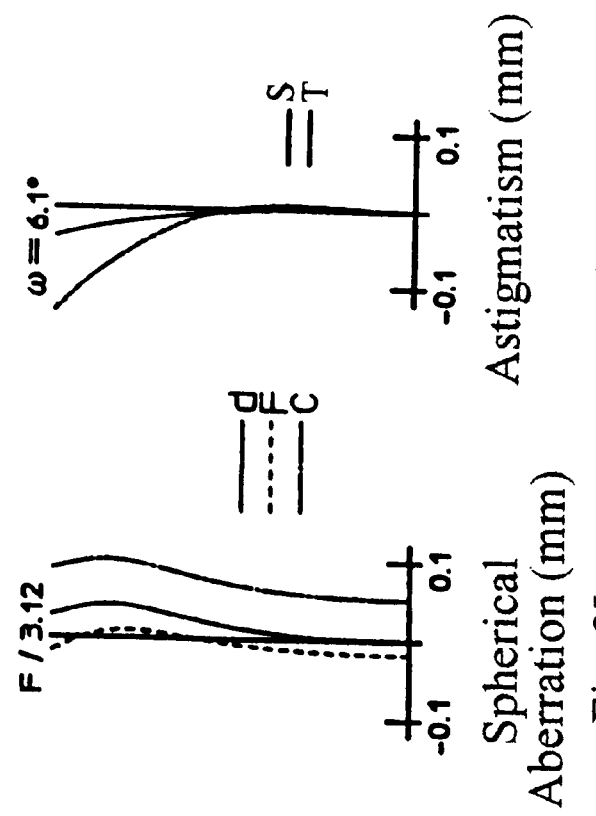
Fig. 2J Astigmatism (mm)
Fig. 2I Spherical Aberration (mm)

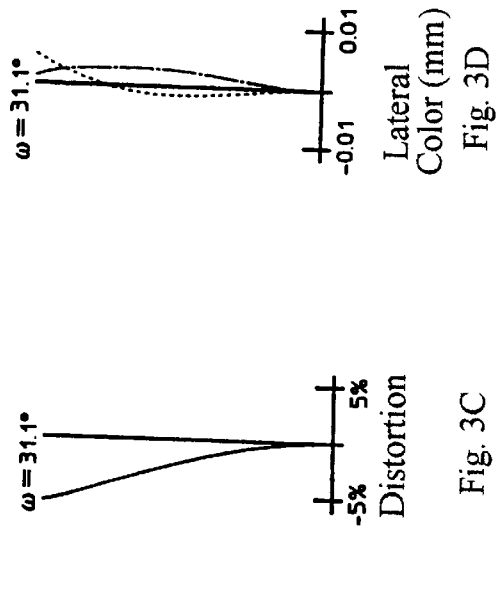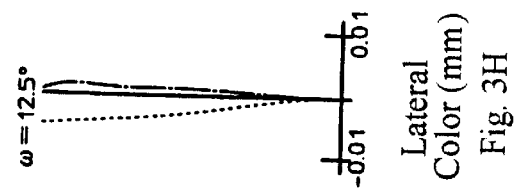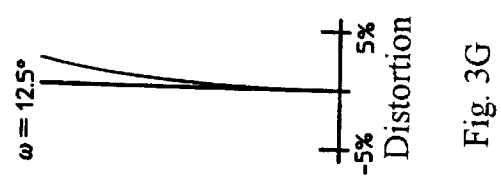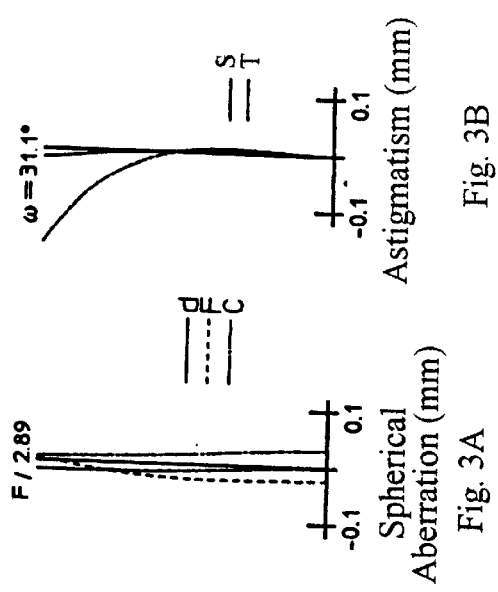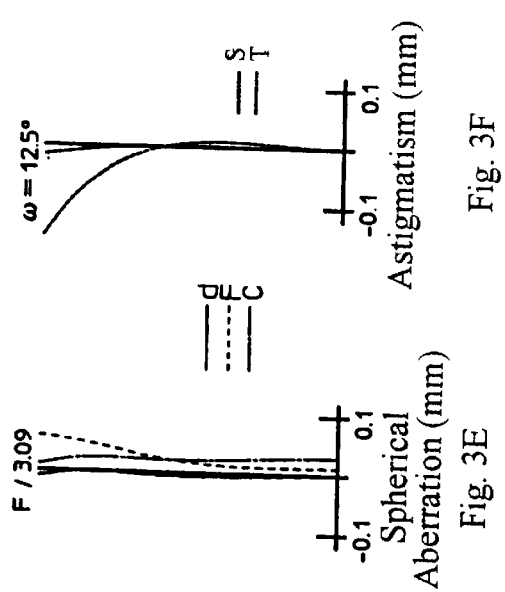

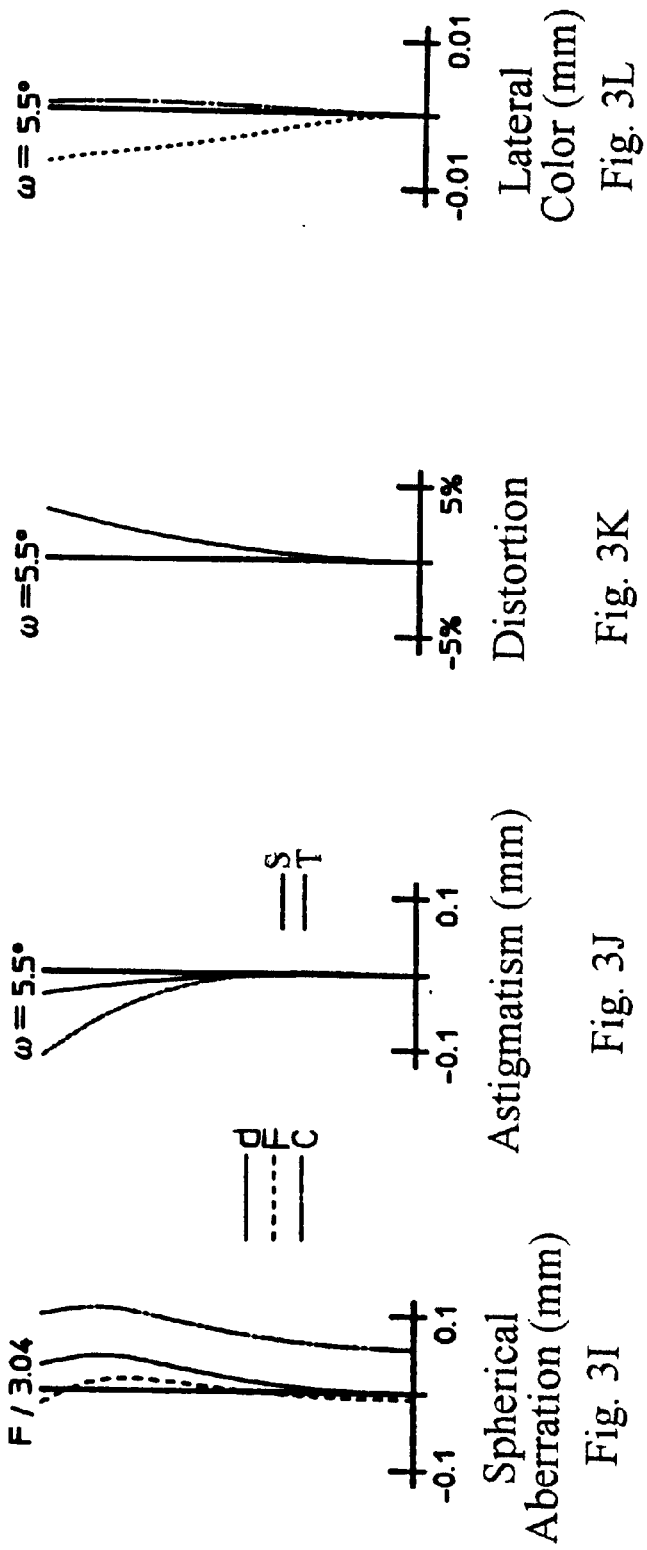

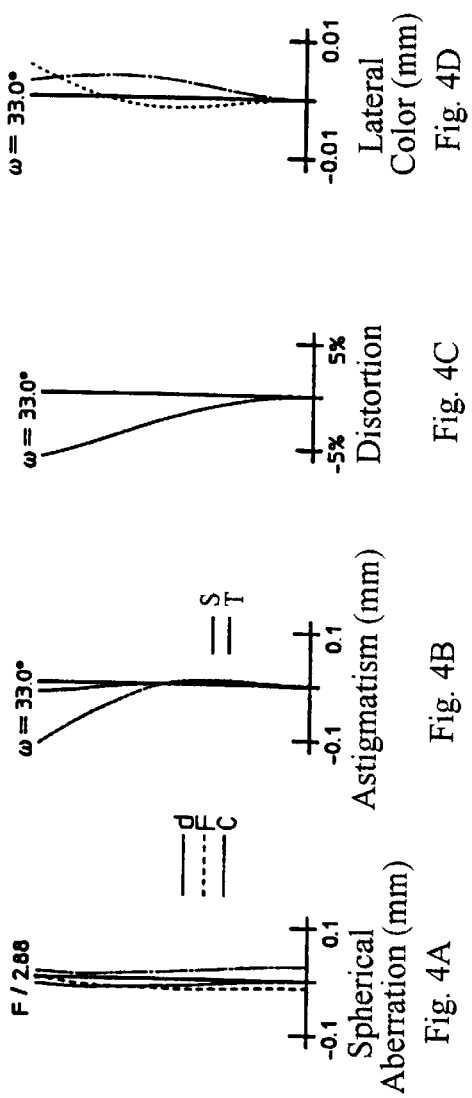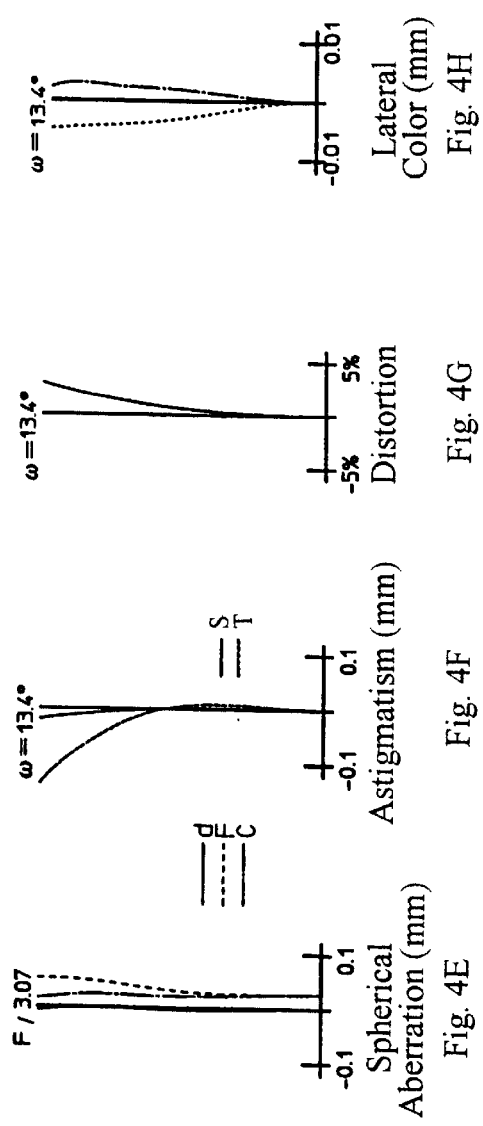

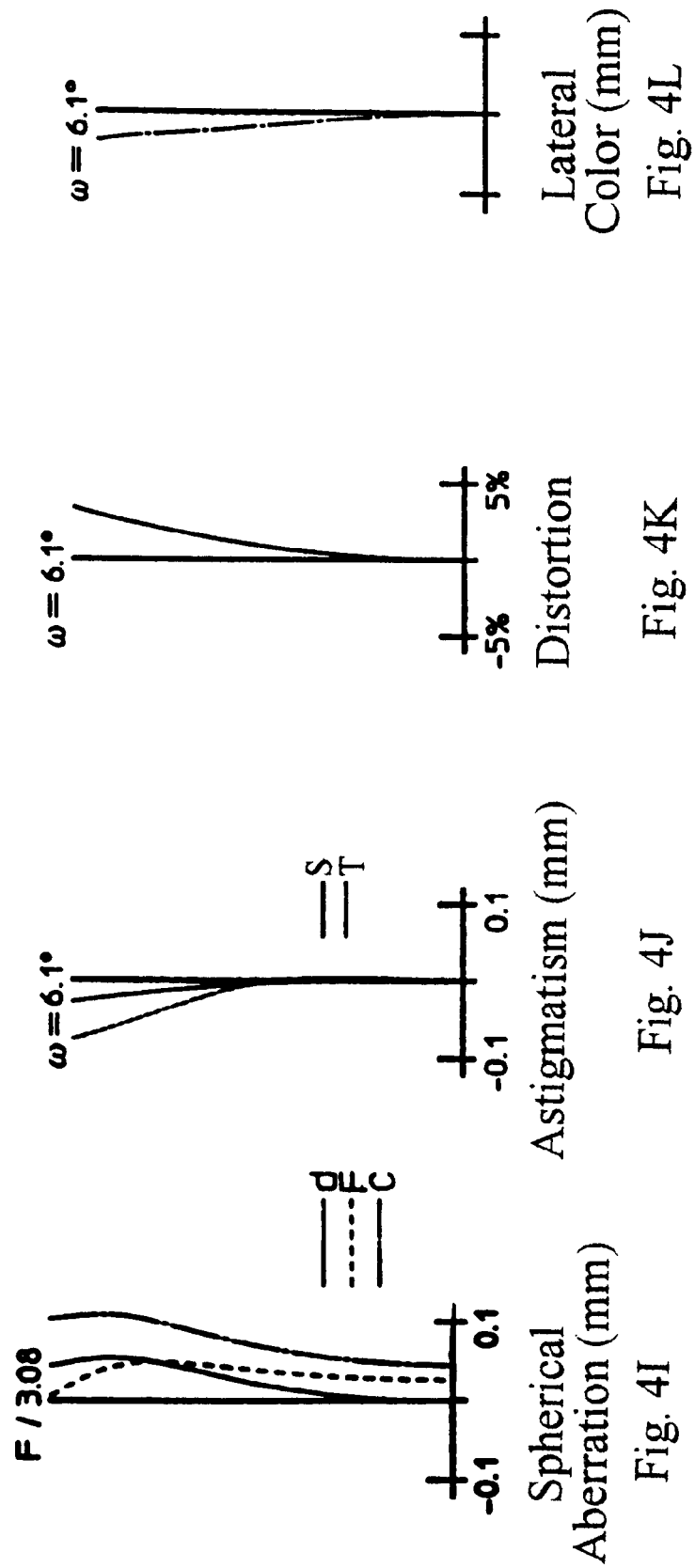

ZOOM LENS

BACKGROUND OF THE INVENTION

Recently, the image detector size in new video cameras being sold has been decreasing from about ⅓ of an inch in linear dimension to about ¼ of an inch in linear dimension. This has placed demands on the development of new zoom lenses for such cameras which are simple in design and yet have a sufficiently high optical performance. As such a zoom lens, rear-focus type lenses have been known in which the entire zoom lens is formed of four lens groups, with the first lens group and the third lens group being fixed in position. Power is varied by moving the second lens group along the optical axis and the image plane is made to remain at a fixed location as the power is varied by moving the fourth lens group along the optical axis. Moreover, lenses with a high variable power ratio, as described in Japanese Laid Open Patent Applications Nos. H8-005916 and H11-194269 have been known for use as zoom lenses for video cameras.

More recently, handy electronic still cameras, so-called digital cameras, have rapidly become popular, and zoom lenses of high variable power ratio have also been used in such electronic still cameras. However, the required degree of compactness is different among video cameras and digital cameras. Therefore, the overall length of zoom lenses for these two applications is also different. Namely, the size of the digital camera is much smaller, as it is desired that such cameras be capable of being carried in a breast pocket of a garment. Thus, the overall length of a zoom lens for a digital camera must be very small. Indeed, the desired overall length of a zoom lens for a digital camera is so small that none of the above-discussed prior art zoom lenses used in video cameras is sufficiently small. Therefore a zoom lens having a shorter overall length has been desired.

In digital cameras, the resolution required of the zoom lens employed has rapidly increased as the pixel size has decreased in linear dimension to about 3–4 $\mu$m. This has made the axial chromatic aberration at the telephoto end increases to the point that it is no longer of little concern.

BRIEF SUMMARY OF THE INVENTION

A first object of the present invention is to provide a zoom lens having a very short overall length so that the zoom lens can be used with a digital camera, while maintaining a high variable power ratio and excellent optical imaging properties. More particularly, a second object of the present invention is to provide a zoom lens having reduced axial chromatic aberration at the telephoto end.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 2A–2D show the spherical aberration, astigmatism, distortion and lateral color, respectively, at the wide-angle end for Embodiment 1, FIGS. 2E–2H show the spherical aberration, astigmatism, distortion and lateral color, respectively, at a mid-position for Embodiment 1, FIGS. 2I–2L show the spherical aberration, astigmatism, distortion and lateral color, respectively, at the telephoto end for Embodiment 1, FIGS. 3A–3D show the spherical aberration, astigmatism, distortion and lateral color, respectively, at the wide-angle end for Embodiment 2, FIGS. 3E–3H show the spherical aberration, astigmatism, distortion and lateral color, respectively, at a mid-position for Embodiment 2, FIGS. 3I–3L show the spherical aberration, astigmatism, distortion and lateral color, respectively, at the telephoto end for Embodiment 2, FIGS. 4A–4D show the spherical aberration, astigmatism, distortion and lateral color, respectively, at the wide-angle end for Embodiment 3, FIGS. 4E–4H show the spherical aberration, astigmatism, distortion and lateral color, respectively, at a mid-position for Embodiment 3, and FIGS. 4I–4L show the spherical aberration, astigmatism, distortion and lateral color, respectively, at the telephoto end for Embodiment 3.

DETAILED DESCRIPTION

Figure 1:
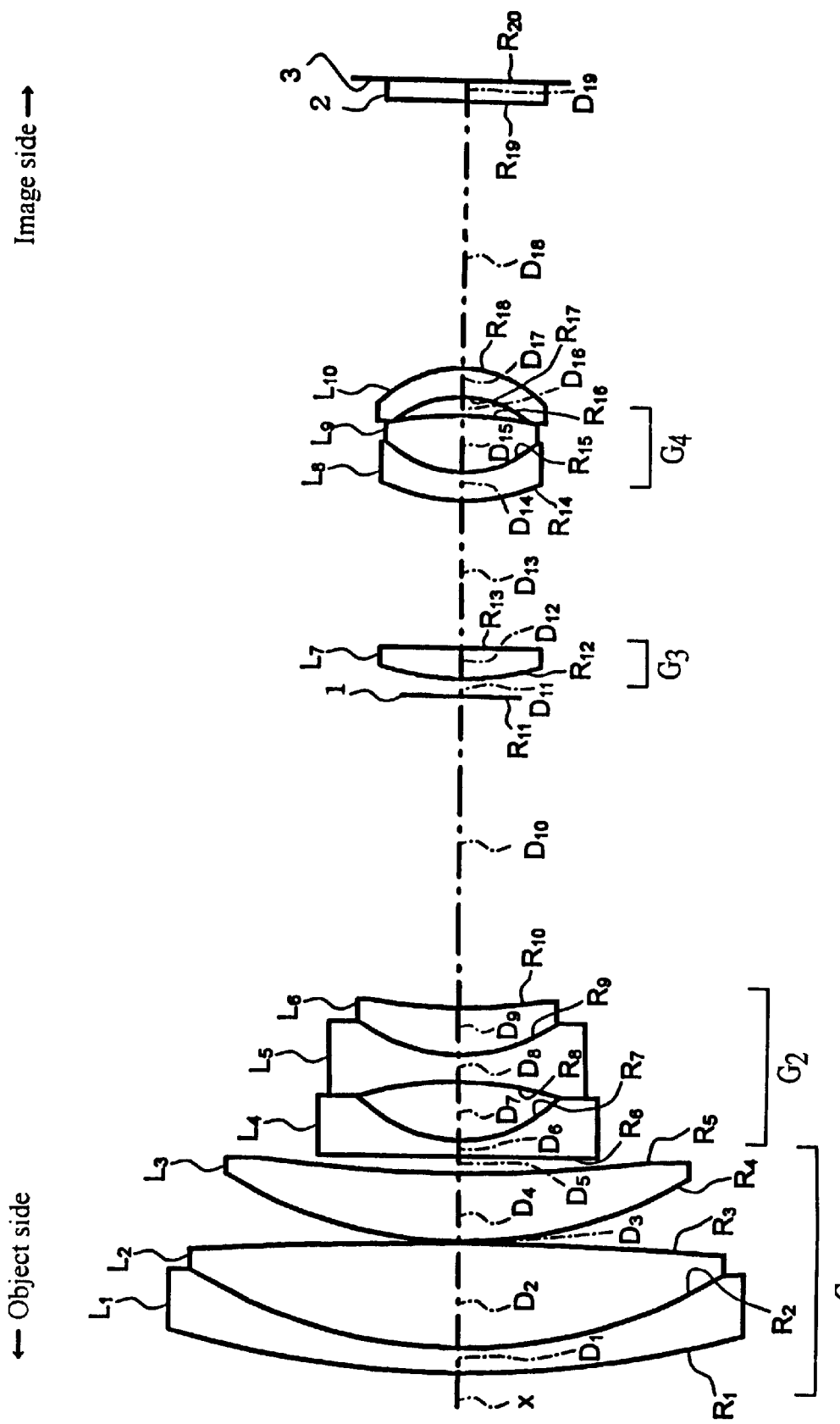
FIG. 1 shows the basic lens element configuration for all embodiments of the present invention.

This invention relates to a rear-focus type zoom lens having four lens groups, particularly to a zoom lens which can achieve a variable power of about 5–6 while having a small overall length that is suitable for use in electronic still cameras. In order from the object side, the four lens groups are of positive, negative, positive, and positive refractive power, respectively. The third lens group consists of a single lens element, at least one surface of which is aspherical, and the fourth lens group also includes a lens element having at least one surface that is aspherical. The first lens group and the third lens group are fixed in position, the focal length of the zoom lens is changed by moving the second lens group along the optical axis, and what would otherwise be fluctuations of the imaging position due to zooming (i.e., for imaging objects at different object distances) are compensated by moving the fourth lens group along the optical axis. The second lens group includes, in order from the object side, a negative lens element having a planar or concave surface on the object side, and an optical element formed of a biconcave lens element that is joined to a positive meniscus lens element having its convex surface on the object side.

Moreover, it is preferable that the fourth lens group includes: (1) a combined lens formed of a negative meniscus lens element having its concave surface on the image side joined to a lens element having a convex surface on the object side, and (2) a single lens element that has at least one surface that is aspherical.

Furthermore, it is preferable that the following Conditions (1) and (2) are both satisfied:

$$\nu 1_d > 50 \qquad \text{Condition (1)}$$

$$\nu 2_d > 50 \qquad \text{Condition (2)}$$

where $\nu 1_d$ is the Abbe number, at the d line, of the biconcave lens element in the second lens group, and $\nu 2_d$ is the Abbe number, at the d line, of the single lens element in the fourth lens group.

Additionally, it is also preferred that the following Condition (3) be satisfied:

$$2.5 < f4/fw < 3.1 \qquad \text{Condition (3)}$$

where
- f4 is the focal length of the fourth lens group, and
- fw is the focal length of the zoom lens at the wide-angle end.

The zoom lens of the present invention achieves a variable power ratio of over 5 as well as a wide-angle of view by having the second lens group formed of a negative lens element having a planar or concave surface on the object side, and a combined lens formed of a biconcave lens element that is joined to a positive meniscus lens element that has its convex surface on the object side.

Moreover, the zoom lens of this invention maintains a fixed image plane during zooming and focusing. Since the first lens group, in order from the object side, is fixed in position, the overall length of the zoom lens, as measured from the vertex of the object side of the first lens group to the image-forming surface does not change when zooming or focusing. Further, the zoom lens is compact enough to be used in a digital camera by having the fourth lens group composed of: (1) a combined lens (a negative meniscus lens element with its convex surface on the object side that is joined to a biconvex lens element), and (2) a single lens element having at least one aspherical surface.

Furthermore, the zoom lens of the present invention enables lateral color aberrations to be favorable, especially at the wide-angle end, by satisfying the above Condition (1) while compensating for axial color aberration, especially on the telephoto side, by satisfying Condition (2). In addition, the zoom lens of the present invention reduces fluctuations of the image plane position which otherwise would occur with zooming by satisfying Condition (3).

As shown in FIG. 1, the zoom lens of each embodiment comprises a first lens group $G_1$ of positive refractive power, a second lens group $G_2$ of negative refractive power, a third lens group $G_3$ of positive refractive power, and a fourth lens group $G_4$ of positive refractive power. Various embodiments of the invention will now be described in detail.

Embodiment 1

The first lens group $G_1$ is formed of, in order from the object side, a first lens element $L_1$ of negative meniscus shape with its convex surface on the object side, a second lens element $L_2$ of biconvex shape having surfaces of different radii of curvature, with the surface of smaller radius of curvature on the object side, and a third lens element $L_3$ of positive meniscus shape with its convex surface on the object side. The first lens element $L_1$ and second lens element $L_2$ are joined to form a combined lens.

The second lens group $G_2$ is formed of, in order from the object side, a fourth lens element $L_4$ of plano-concave shape with its concave surface on the image side, a fifth lens element $L_5$ of biconcave shape with surfaces of different radii of curvature, with the surface of smaller radius of curvature on the image side, and a sixth lens element $L_6$ of positive meniscus shape with its convex surface on the object side. The fifth lens element $L_5$ and sixth lens element $L_6$ are joined to form a combined lens.

The third lens group $G_3$ is formed of a seventh lens element $L_7$ having a plano-convex shape, with its convex surface on the object side being aspherical.

The fourth lens group $G_4$ is formed of, in order from the object side, an eighth lens element $L_8$ having a meniscus shape with its convex surface on the object side, a ninth lens element $L_9$ having a biconvex shape with surfaces of different radii of curvature, with the surface of smaller radius of curvature on the object side, and a tenth lens element $L_{10}$ having a positive meniscus shape with its convex surface on the image side. The eighth lens element $L_8$ and ninth lens element $L_9$ are joined to form a combined lens, and the image-side surface of the tenth lens element $L_{10}$ is aspherical. Moreover, this zoom lens satisfies each of the above Conditions (1)–(3).

Furthermore, a diaphragm 1 is arranged on the object side of the third lens group $G_3$, and a CCD array that includes a cover glass 2 with a low-pass filter (not shown) is arranged at the image surface. Thus, a light beam that is incident from the object side along the optical axis X is imaged onto a detecting surface 3 of the CCD array.

Table 1 below lists the surface number # in order from the object side, the radius of curvature R (in mm) of each surface near the optical axis, the on-axis spacing D (in mm) between surfaces, as well as the index of refraction $N_d$ and the Abbe Number $\nu_d$ (at the d line) of each lens element of Embodiment 1. Further, the focal length f of the zoom lens, the F number $F_{NO}$ and the range of picture angles 2ω (from the wide-angle end to the telephoto end) are given in the lower portion of the table.

TABLE 1

| # | R | D | $N_d$ | $\nu_d$ |
|---|---|---|---|---|
| 1 | 67.0393 | 1.50000 | 1.84666 | 23.8 |
| 2 | 32.1650 | 6.47000 | 1.62041 | 60.3 |
| 3 | −274.0495 | 0.13000 | | |
| 4 | 27.9582 | 4.20000 | 1.71300 | 53.9 |
| 5 | 93.8790 | D5 (variable) | | |
| 6 | ∞ | 1.00000 | 1.88300 | 40.8 |
| 7 | 8.7967 | 3.63300 | | |
| 8 | −22.0199 | 1.66000 | 1.48749 | 70.4 |
| 9 | 10.5890 | 2.93000 | 1.84666 | 23.8 |
| 10 | 36.9291 | D10 (variable) | | |
| 11 | stop | 1.12500 | | |
| 12* | 16.5772 | 1.95000 | 1.51760 | 63.5 |
| 13 | ∞ | D13 (variable) | | |
| 14 | 12.1536 | 1.80000 | 1.84666 | 23.8 |
| 15 | 7.0410 | 3.50000 | 1.48749 | 70.4 |
| 16 | −24.6606 | 1.08700 | | |
| 17 | −7.0389 | 1.85000 | 1.51760 | 63.5 |
| 18* | −6.7477 | D18 (variable) | | |
| 19 | ∞ | 1.20000 | 1.51680 | 64.2 |
| 20 | ∞ | | | | f = 8.08 – 44.82   $F_{NO}$ = 2.88 – 3.12   2ω = 66.2 – 12.2°

The overall length of the zoom lens of this embodiment (from the vertex of the object side of the first lens group to the image plane) is 80.0 mm. Those surfaces with a * to the right of the surface number in Table 1 are aspherical surfaces, and the aspherical surface shape is expressed by Equation (A) below.

$$Z = CY^2/\{1+(1-KC^2Y^2)^{1/2}\} + A_4Y^4 + A_6Y^6 + A_8Y^8 + A_{10}Y^{10} \quad \text{(Equation A)}$$

where
- Z is the length (in mm) of a line drawn from a point on the aspherical surface at distance Y from the optical axis to the tangential plane of the aspherical surface vertex,
- C (=1/R) is the curvature of the aspherical surface near the optical axis,
- Y is the distance (in mm) from the optical axis,
- K is the eccentricity, and
- $A_4$, $A_6$, $A_8$, and $A_{10}$ are the 4th, 6th, 8th, and 10th aspherical coefficients.

The values of each of the constants K and $A_4$–$A_{10}$ of the aspherical surfaces indicated in Table 1 are shown in the top portion of Table 2. The values of D5, D10, D13, D18 at positions resulting in the zoom lens having focal lengths of f=8.08 (i.e., fw), f=20.2, f=44.8) are shown in the middle portion of Table 2, and the value of f4/fw is shown in the lower portion of the table.

TABLE 2

| Aspherical coefficients of Surface #12 | Aspherical coefficients of Surface #18 | | | |
|---|---|---|---|---|
| K = 0.7742461766 | K = 0.7057989793 | | | |
| $A_2 = -0.3154268352 \times 10^{-4}$ | $A_2 = 0.4984741710 \times 10^{-4}$ | | | |
| $A_3 = -0.6214297832 \times 10^{-6}$ | $A_3 = -0.1395366239 \times 10^{-5}$ | | | |
| $A_4 = 0.3820617076 \times 10^{-7}$ | $A_4 = 0.1254094025 \times 10^{-7}$ | | | |
| $A_5 = -0.1057579273 \times 10^{-8}$ | $A_5 = -0.9724176338 \times 10^{-9}$ | | | |
| f | D5 | D10 | D13 | D18 |
| 8.08 | 1.03 | 19.375 | 9.029 | 16.476 |
| 20.2 | 11.699 | 8.707 | 5.297 | 20.208 |
| 44.8 | 18.727 | 1.678 | 4.926 | 20.579 | f4/fw = 2.799

Conditions (1), (2) and (3) are satisfied for this embodiment, since the value of $v1_d$ is 70.4 (see Table 1), the value of $v2_d$ is 63.5 (see Table 1), and the value of the ratio f4/fw is 2.799 (as given in Table 2).

Embodiment 2

The zoom lens of Embodiment 2 has nearly the same lens element configuration as that of Embodiment 1, but it is different in that the seventh lens element $L_7$ in this embodiment is a biconvex lens having surfaces of different radii of curvature, with the surface of smaller radius of curvature on the object side.

Table 3 below lists the surface number # in order from the object side, the radius of curvature R (in mm) of each surface near the optical axis, the on-axis spacing D (in mm) between surfaces, as well as the index of refraction $N_d$ and the Abbe Number $v_d$ (at the d line) of each lens element of Embodiment 2. Further, the focal length f of the zoom lens, the F number $F_{NO}$ and the range of picture angles 2ω (from the wide-angle end to the telephoto end) are given in the lower portion of the table.

TABLE 3

| # | R | D | $N_d$ | $v_d$ |
|---|---|---|---|---|
| 1 | 63.7836 | 1.50000 | 1.84666 | 23.8 |
| 2 | 30.4741 | 6.26378 | 1.71300 | 53.9 |
| 3 | −334.4146 | 0.10000 | | |
| 4 | 24.5563 | 4.48721 | 1.56384 | 60.7 |
| 5 | 73.1850 | D5 (variable) | | |
| 6 | ∞ | 1.00000 | 1.88300 | 40.8 |
| 7 | 8.6943 | 4.28294 | | |
| 8 | −20.1897 | 1.01000 | 1.48749 | 70.4 |
| 9 | 10.7502 | 2.80068 | 1.84666 | 23.8 |
| 10 | 41.0292 | D10 (variable) | | |
| 11 | stop | 1.50000 | | |
| 12* | 17.3999 | 2.13607 | 1.51760 | 63.5 |
| 13 | −135.4775 | D13 (variable) | | |
| 14 | 13.7563 | 1.80000 | 1.84666 | 23.8 |
| 15 | 7.6818 | 3.32979 | 1.48749 | 70.4 |
| 16 | −24.1785 | 1.24776 | | |
| 17 | −8.2249 | 1.87795 | 1.51760 | 63.5 |
| 18* | −7.7694 | D18 (variable) | | |
| 19 | ∞ | 1.20000 | 1.51680 | 64.2 |
| 20 | ∞ | | | |

F = 8.71 − 48.3    $F_{NO}$ = 2.89 − 3.05    2ω = 62.2° − 11.0°

The overall length of the zoom lens of this embodiment (from the vertex of the object side of the first lens group to the image plane) is 80.0 mm. Those surfaces with a * to the right of the surface number in Table 3 are aspherical surfaces, and the aspherical surface shape is expressed by Equation (A) above. The values of each of the constants K and $A_4$–$A_{10}$ of the aspherical surfaces indicated in Table 3 are shown in the top portion of Table 4. The values of D5, D10, D 13, D18 at positions resulting in the zoom lens having focal lengths of f=8.71 (i.e., fw), f=21.8, and f=48.3 are shown in the middle portion of Table 4, and the value of the ratio f4/fw is shown in the lower portion of the table.

TABLE 4

| Aspherical coefficients of surface #12 | Aspherical coefficients of surface #18 | | | |
|---|---|---|---|---|
| K = 0.6532030275 | K = 0.7513747068 | | | |
| $A_2 = -0.3506050826 \times 10^{-4}$ | $A_2 = 0.4953224677 \times 10^{-4}$ | | | |
| $A_3 = -0.4251705791 \times 10^{-6}$ | $A_3 = -0.7859310777 \times 10^{-5}$ | | | |
| $A_4 = 0.2094701593 \times 10^{-7}$ | $A_4 = 0.6897117528 \times 10^{-8}$ | | | |
| $A_5 = -0.4742574727 \times 10^{-9}$ | $A_5 = -0.4599956246 \times 10^{-9}$ | | | |
| f | D5 | D10 | D13 | D18 |
| 8.71 | 1.018 | 19.000 | 8.382 | 17.047 |
| 21.8 | 11.283 | 8.735 | 4.610 | 20.819 |
| 48.3 | 18.104 | 1.913 | 5.179 | 20.250 | f4/fw = 2.842

Conditions (1), (2) and(3) are satisfied for this embodiment, since the value of $v1_d$ is 70.4 (see Table 3), the value of $v2_d$ is 63.5 (see Table 3), and the value of the ratio f4/fw is 2.842 (as given in Table 4).

Embodiment 3

The zoom lens of Embodiment 3 has nearly the same lens element configuration as that of Embodiment 2, but it is different in that the fourth lens element $L_4$ is biconcave having surfaces of different radii of curvature, with the surface of larger radius of curvature being on the object side, and the seventh lens element $L_7$ in this embodiment is a biconvex lens element having surfaces of different radii of curvature, with the surface of smaller radius of curvature on the object side.

Table 5 below lists the surface number # in order from the object side, the radius of curvature R (in mm) of each surface near the optical axis, the on-axis spacing D (in mm) between surfaces, as well as the index of refraction $N_d$ and the Abbe Number $v_d$ (at the d line) of each lens element of Embodiment 3. Further, the focal length f of the zoom lens, the F number $F_{NO}$ and the range of picture angles 2ω (from the wide-angle end to the telephoto end) are given in the lower portion of the table.

TABLE 5

| # | R | D | $N_d$ | $v_d$ |
|---|---|---|---|---|
| 1 | 52.0657 | 1.49999 | 1.84666 | 23.8 |
| 2 | 30.5464 | 6.74895 | 1.49700 | 81.5 |
| 3 | −211.7404 | 0.10000 | | |
| 4 | 26.7405 | 4.37914 | 1.71300 | 53.9 |
| 5 | 95.7874 | D5 (variable) | | |
| 6 | −9103.4885 | 1.00000 | 1.88300 | 40.8 |
| 7 | 8.4282 | 3.44255 | | |
| 8 | −21.6421 | 1.46263 | 1.52249 | 59.8 |
| 9 | 10.0336 | 3.10282 | 1.84666 | 23.8 |
| 10 | 46.1903 | D10 (variable) | | |
| 11 | (stop) | 1.50000 | | |
| 12* | 16.4229 | 2.08166 | 1.51760 | 63.5 |
| 13 | −400.1927 | D13 (variable) | | |
| 14 | 13.1863 | 1.80000 | 1.84666 | 23.8 |

TABLE 5-continued

| # | R | D | $N_d$ | $\nu_d$ |
|---|---|---|---|---|
| 15 | 7.3701 | 3.20712 | 1.48749 | 70.4 |
| 16 | −21.1520 | 1.20435 | | |
| 17 | −6.5727 | 1.84345 | 1.51760 | 63.5 |
| 18* | −6.4671 | D18 (variable) | | |
| 19 | ∞ | 1.20000 | 1.51680 | 64.2 |
| 20 | ∞ | | | | f = 8.11 − 45.00   $F_{NO}$ = 2.88 − 3.08   2ω = 66.0° − 12.2°

The overall length of the zoom lens of this embodiment (from the vertex of the object side of the first lens group to the image plane) is 80.0 mm. Those surfaces with a * to the right of the surface number in Table 5 are aspherical surfaces, and the aspherical surface shape is expressed by Equation (A) above. The values of each of the constants K and $A_4$–$A_{10}$ of the aspherical surfaces indicated in Table 5 are shown in the top portion of Table 6. The values of D5, D 10, D13, D18 at positions resulting in the zoom lens having focal lengths of f=8.11 (i.e., fw), f=20.3, and f=45.0 are shown in the middle portion of Table 6, and the value of the ratio f4/fw is shown in the lower portion of the table.

TABLE 6

| Aspherical coefficients of surface #12 | Aspherical coefficients of surface #18 |
|---|---|
| K = 0.9264641656 | K = 0.7342702751 |
| $A_2$ = −0.3802321152 × $10^{-4}$ | $A_2$ = 0.4041192633 × $10^{-4}$ |
| $A_3$ = −0.5752001227 × $10^{-6}$ | $A_3$ = −0.1447026660 × $10^{-5}$ |
| $A_4$ = 0.3949579841 × $10^{-7}$ | $A_4$ = 0.1485066987 × $10^{-7}$ |
| $A_5$ = −0.1128302302 × $10^{-8}$ | $A_5$ = −0.9926608602 × $10^{-9}$ |

| f | D5 | D10 | D13 | D18 |
|---|---|---|---|---|
| 8.11 | 1.000 | 19.000 | 8.721 | 16.712 |
| 20.3 | 11.455 | 8.545 | 4.972 | 20.461 |
| 45.0 | 18.313 | 1.687 | 4.837 | 20.596 | f4/fw = 2.867

Conditions (1), (2) and (3) are satisfied for this embodiment, since the value of $\nu 1_d$ is 59.8 (see Table 5), the value of $\nu 2_d$ is 63.5 (see Table 5), and the value of the ratio f4/fw is 2.867 (as given in Table 6).

FIGS. 2A–2D show the spherical aberration, astigmatism, distortion and lateral color, respectively, at the wide-angle end for Embodiment 1, FIGS. 2E–2H show the spherical aberration, astigmatism, distortion and lateral color, respectively, at a mid-position for Embodiment 1, FIGS. 2I–2L show the spherical aberration, astigmatism, distortion and lateral color, respectively, at the telephoto end for Embodiment 1, FIGS. 3A–3D show the spherical aberration, astigmatism, distortion and lateral color, respectively, at the wide-angle end for Embodiment 2, FIGS. 3E–3H show the spherical aberration, astigmatism, distortion and lateral color, respectively, at a mid-position for Embodiment 2, FIGS. 3I–3L show the spherical aberration, astigmatism, distortion and lateral color, respectively, at the telephoto end for Embodiment 2, FIGS. 4A–4D show the spherical aberration, astigmatism, distortion and lateral color, respectively, at the wide-angle end for Embodiment 3, FIGS. 4E–4H show the spherical aberration, astigmatism, distortion and lateral color, respectively, at a mid-position for Embodiment 3, and FIGS. 4I–4L show the spherical aberration, astigmatism, distortion and lateral color, respectively, at the telephoto end for Embodiment 3.

Moreover, the spherical aberration is shown for the d, F and C lines, and the astigmatism is shown for both the sagittal S image surface and tangential T image surface. As is evident from these figures, all embodiments of the invention favorably correct these aberrations. Further, axial color at the telephoto end is reduced as compared to prior art lenses.

As described above, the zoom lens of this invention enables the zoom lens to achieve a variable power ratio of over 5 and have a wide angle of view by reason of the second lens group being composed of a negative lens element having a concave or planar surface on the object side, and a combined lens formed of a biconcave lens element joined to a positive meniscus lens element with its convex surface on the object side. Such a design enables the overall length of the zoom lens to be short enough for use in a digital camera.

The invention being thus described, it will be obvious that the same may be varied in many ways. For example the radius of curvatures R near the optical axis and surface spacings D may be readily scaled to achieve a lens of a desired focal length. Further, in the third and fourth lens groups, the lens surfaces having aspherical surfaces may be formed on other lens surfaces. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. A zoom lens formed of no more than four lens groups having refractive power, in order from the object side, as follows:

a first lens group that is fixed in position and has positive refractive power;

a second lens group having negative refractive power, the position of the second lens group being variable along the optical axis in order to change the focal length of the zoom lens, said second lens group including, in order from the object side, a negative lens element having a concave surface or a planar surface on its object side, and a combined lens which includes a biconcave lens element joined to a positive meniscus lens element with its convex surface on the object side;

a third lens group that is fixed in position and has positive refractive power, said third lens group consisting of a single lens element with at least one surface thereof being aspherical; and, a fourth lens group having positive refractive power and including a lens element having an aspherical surface, the position of the fourth lens group being variable along the optical axis in order to compensate for what would otherwise be movement of the image plane due to changes in the amount of zoom and the object distance.

2. The zoom lens of claim 1, said fourth lens group including:

a combined lens that includes a negative meniscus lens element with its convex surface on the object side joined to another lens element, and a single lens element having at least one surface that is aspherical.

3. The zoom lens of claim 2, wherein the following Conditions (1) and (2) are satisfied:

$$\nu 1_d > 50 \quad \text{Condition (1)}$$

$$\nu 2_d > 50 \quad \text{Condition (2)}$$

where
- $\nu 1_d$ is the Abbe number at the d line of the biconcave lens element of the second lens group; and
- $\nu 2_d$ is the Abbe number at the d line of the single lens element in the fourth lens group.

4. The zoom lens of claim 1, wherein the following Condition (3) is satisfied:

$$2.5 < f4/fw < 3.1 \quad \text{Condition (3)}$$

where
- f4 is the focal length of the fourth lens group, and
- fw is the focal length of the zoom lens at the wide-angle end.

5. The zoom lens of claim 2, wherein the following Condition (3) is satisfied:

$$2.5 < f4/fw < 3.1 \quad \text{Condition (3)}$$

where
- f4 is the focal length of the fourth lens group, and
- fw is the focal length of the zoom lens at the wide-angle end.

6. The zoom lens of claim 3, wherein the following Condition (3) is also satisfied:

$$2.5 < f4/fw < 3.1 \quad \text{Condition (3)}$$

where
- f4 is the focal length of the fourth lens group, and
- fw is the focal length of the zoom lens at the wide-angle end.

* * * * *

UNITED STATES PATENT AND TRADEMARK OFFICE
CERTIFICATE OF CORRECTION

PATENT NO. : 6,317,272 B1
DATED : November 13, 2001
INVENTOR(S) : Ori

Page 1 of 1

It is certified that error appears in the above-identified patent and that said Letters Patent is hereby corrected as shown below:

Column 6,
Line 6, change "D 13" to -- D13 --;

Column 7,
Line 20, change "D 10" to -- D10 --;

Column 9, claim 4,
Line 2, change "is" to -- is also --; and

Column 10, claim 5,
Line 2, change "is" to -- is also --.

Signed and Sealed this

Twelfth Day of March, 2002

Attest:

Attesting Officer

JAMES E. ROGAN
Director of the United States Patent and Trademark Office